United States Patent
Hirano et al.

(10) Patent No.: US 7,224,684 B2
(45) Date of Patent: May 29, 2007

(54) COMMUNICATION TERMINAL ACCOMMODATING APPARATUS AND COMMUNICATION TERMINAL ACCOMMODATING METHOD

(75) Inventors: Jun Hirano, Yokosuka (JP); Takashi Aramaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1062 days.

(21) Appl. No.: 10/111,104

(22) PCT Filed: Aug. 28, 2001

(86) PCT No.: PCT/JP01/07347

§ 371 (c)(1),
(2), (4) Date: Apr. 22, 2002

(87) PCT Pub. No.: WO02/19632

PCT Pub. Date: Mar. 7, 2002

(65) Prior Publication Data

US 2002/0154617 A1  Oct. 24, 2002

(30) Foreign Application Priority Data

Aug. 28, 2000 (JP) ............................ 2000-257902
Mar. 9, 2001 (JP) ................................ 2001-67171

(51) Int. Cl.
*H04B 7/212* (2006.01)
*H04Q 7/00* (2006.01)
*H04J 3/16* (2006.01)

(52) U.S. Cl. .................... 370/348; 370/329; 370/468

(58) Field of Classification Search ................ 370/338, 370/445, 450, 443, 447, 448, 468, 329, 230, 370/235, 236, 328; 455/343.3, 434, 464, 455/63.1, 63.2, 41.2; 375/133, 356
See application file for complete search history.

(56) References Cited

U.S. PATENT DOCUMENTS 5,398,248 A * 3/1995 Shepherd .................... 370/346

(Continued)

FOREIGN PATENT DOCUMENTS

AU  WO 01/37497  * 11/1999

(Continued)

OTHER PUBLICATIONS

International Search Report dated Nov. 27, 2001.

*Primary Examiner*—Hassan Kizou
*Assistant Examiner*—Warner Wong
(74) *Attorney, Agent, or Firm*—Stevens, Davis, Miller & Mosher, LLP

(57) ABSTRACT

In a communication terminal holding apparatus 101, the control right of communication in a direct link type network is acquired by a control right acquiring section 205. After acquiring the control right, a first scheduling section 203 assigns communication resources to a terminal apparatus in the direct link type network. A second scheduling section 204 cooperates with a first scheduling section 203 so as not to allow any competition or collision of communication resources in the communication between the direct link type network and the master-slave type network and assigns communication resources to a terminal apparatus in the master-slave type network. Owing to this, it is enabled to use a slave terminal apparatus in a master-slave type network as it is in a network integrated with a direct link type network.

13 Claims, 9 Drawing Sheets

U.S. PATENT DOCUMENTS

| | | | |
|---|---|---|---|
| 6,954,616 B2 * | 10/2005 | Liang et al. | 455/63.1 |
| 6,963,549 B1 * | 11/2005 | Jayaraman et al. | 370/328 |
| 6,990,082 B1 * | 1/2006 | Zehavi et al. | 370/280 |
| 7,024,482 B2 * | 4/2006 | Hlasny | 709/227 |
| 7,046,649 B2 * | 5/2006 | Awater et al. | 370/338 |
| 7,079,812 B2 * | 7/2006 | Miller et al. | 455/63.1 |
| 2002/0136233 A1 * | 9/2002 | Chen et al. | 370/445 |
| 2002/0156907 A1 * | 10/2002 | Hirano et al. | 709/229 |
| 2003/0083095 A1 * | 5/2003 | Liang | 455/552 |

FOREIGN PATENT DOCUMENTS

| | | |
|---|---|---|
| JP | 5102969 | 4/1993 |
| JP | 07303105 | 11/1995 |
| JP | 10190717 | 7/1998 |
| JP | 11008890 | 1/1999 |
| JP | 11055318 | 2/1999 |
| JP | 11252114 | 9/1999 |

* cited by examiner

COMMUNICATION TERMINAL ACCOMMODATING APPARATUS AND COMMUNICATION TERMINAL ACCOMMODATING METHOD

TECHNICAL FIELD

The present invention relates to a communication terminal holding apparatus and a communication terminal holding method in a wire communication system and a mobile communication system, and more particularly, to a communication terminal holding apparatus and a communication terminal holding method which enable a slave terminal apparatus in a master-slave type network to be used as it is when the same is integrated with a direct link type network.

BACKGROUND ART

In multimedia interface for which the needs has been sharply increased recently, a high speed and large capacity data transmission under various user circumstances, such as in public, office, home and the like, is desired. As one of multimedia interfaces which provide such high speed and large capacity data transmission, a high speed wireless access network, a high speed radio access network or the like is getting the focus of public interest.

As examples of typical structures of such networks, there are a master-slave type network and a direct link type network. In the master-slave type network, by means of a central control via a communication terminal holding apparatus, a plurality of terminal apparatus carry out communication with the communication terminal holding apparatus. On the other hand, in the direct link type network, by means of a central control via a communication terminal holding apparatus, which has the control right in one or more communication terminal holding apparatus, a plurality of terminal apparatus and other communication terminal holding apparatus carry out communications respectively.

A master-slave type network shown in FIG. 1 comprises a communication terminal holding apparatus 11 which has an access point (AP) facility equivalent to a base station apparatus in a mobile communication system, and MT device apparatus 12, 13 and 14 having a mobile terminal (MT) facility respectively, which is equivalent to mobile station apparatus of a portable telephone apparatus or the like. In the master-slave type network, the communication terminal holding apparatus 11 carries out a scheduling in which communication resources such as time area and frequency or the like are assigned, and the communications between the MT device apparatus is made by surely being interposed by the communication terminal holding apparatus 11. For example, in a case where the MT device apparatus 12 carries out a communication with the MT device apparatus 14, the MT device apparatus 12 transmits a signal to the communication terminal holding apparatus 11 in accordance with the scheduling by the communication terminal holding apparatus 11.

A direct link type network shown in FIG. 2 comprises CC/WT device apparatus 21 and 22, which have a central controller (CC) facility and a wireless terminal (WT) facility, and WT device apparatus 23 and 24, which have a WT facility only, and communication is made directly between the WT device apparatus. Herein, the control right is transferred periodically between the CC/WT device apparatus 21 and 22, which have the CC facility respectively, and the apparatus having the control right carries out the scheduling. For example, when the CC/WT device apparatus 22 makes a request for a communication with the WT device apparatus 24 at a point of time when the CC/WT device apparatus 21 has the control right, the CC/WT device apparatus 21 carries out the scheduling in which communications resources such as time area and frequency or the like are assigned.

Since each MT device apparatus carries out data communication only to the communication terminal holding apparatus, the master-slave type network has such merit that the MT device apparatus has a simple structure. On the other hand, since the data communication is carried out directly between the WT device apparatus without being interposed by any other apparatus, the direct link type network has such a merit that the communication resources can be utilized effectively.

As the field of the network application expands, such needs that the MT device apparatus used in the master-slave type network is desired to use also in the direct link type network are raised. As one of the methods to meet the needs, such a method that, as shown in FIG. 3, a terminal apparatus 31, in which a WT facility is added to a MT facility is introduced, has been proposed conventionally.

However, in this method, such problems reside therein, i.e., an MT device, which is conventionally used, can not be used as it is and the size of the terminal apparatus becomes larger resulting in elimination of the merits of the master-slave type network. Also another problem such that MT device apparatus (MT device apparatus 13, 14 in FIG. 3), which are not provided with the MT facility, can not be used in a direct link type network resides in.

DISCLOSURE OF INVENTION

An object of the present invention is to provide a communication terminal holding apparatus and a communication terminal holding method that enable an MT device apparatus to be used as it is in a network in which a direct link type network and a master-slave type network are integrated with each other.

The forgoing object can be achieved in such manner that a communication terminal holding apparatus having the respective facilities of CC/WT/AP carries out communication resource assignment to the respective networks so as not to allow any competition or collision thereof after acquiring the control right of a direct link type network.

BEST MODE FOR CARRYING OUT THE INVENTION

Now, embodiments of the present invention will be described below with reference to accompanying-drawings (First Embodiment)

Figure 1:
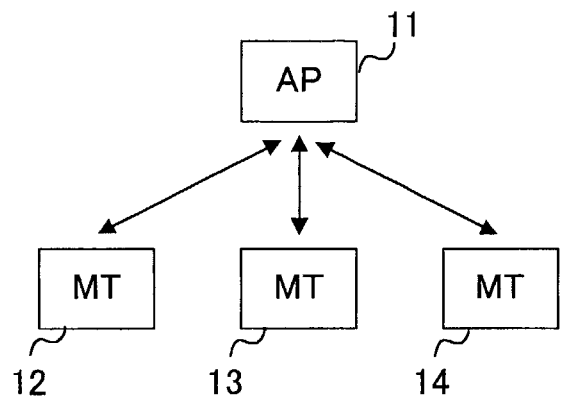
FIG. 1 is a block diagram showing a constitution of a master-slave type network.
Figure 2:
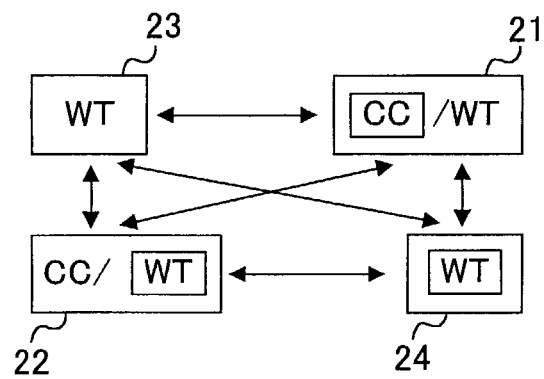
FIG. 2 is a block diagram showing a constitution of a direct link type network.
Figure 3:
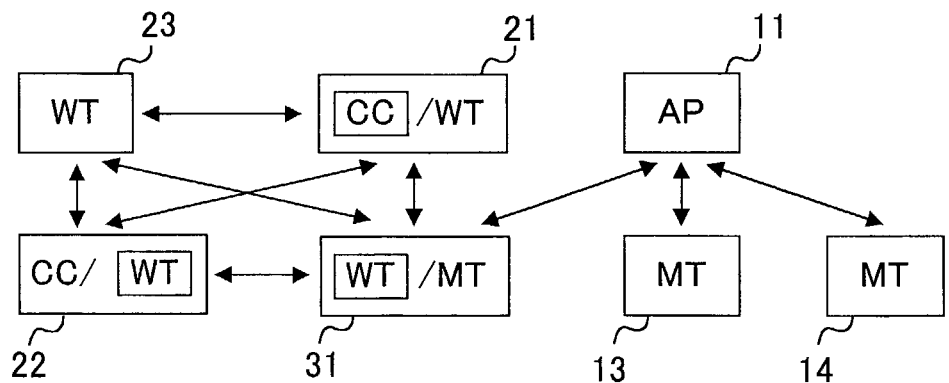
FIG. 3 is a block diagram showing a network in which a conventional master-slave type network and a direct link type network are integrated with each other.
Figure 4:
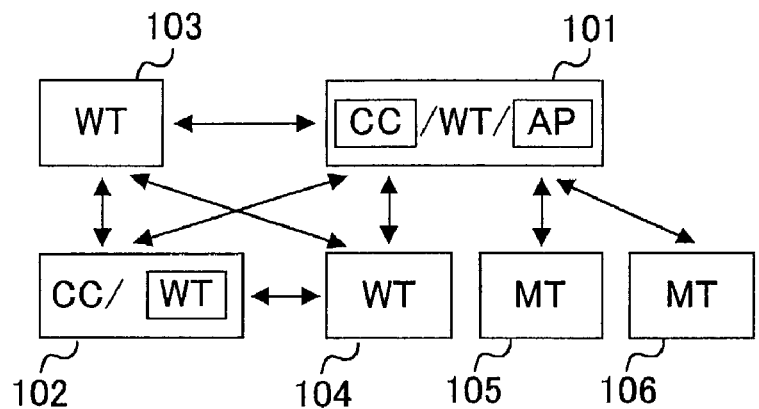
FIG. 4 is a block diagram showing a configuration of a network using a communication terminal holding apparatus according to a first embodiment of the present invention.

FIG. 4 is a block diagram showing a configuration of a network, in which a direct link type network and a master-slave type network are integrated with each other, using a communication terminal holding apparatus according to a first embodiment of the present invention.

The network shown in FIG. 4 comprises a communication terminal holding apparatus 101 that has a central controller (CC) facility, a wireless terminal (WT) facility and an access point (AP) facility; a CC/WT device apparatus 102 that has a CC facility and a WT facility; WT device apparatus 103 and 104 that have a WT facility only and MT device apparatus 105 and 106 that have a mobile terminal (MT) facility only.

In the communication terminal holding apparatus 101, the CC facility in the direct type network and the AP facility of the master-slave type network are adapted so as to operate together. Also, the CC facility is adapted so as to operate after acquiring the control right of communication from the terminal apparatus 102, which has CC/WT facilities, when the communication terminal holding apparatus 101 is in service.

Figure 5:
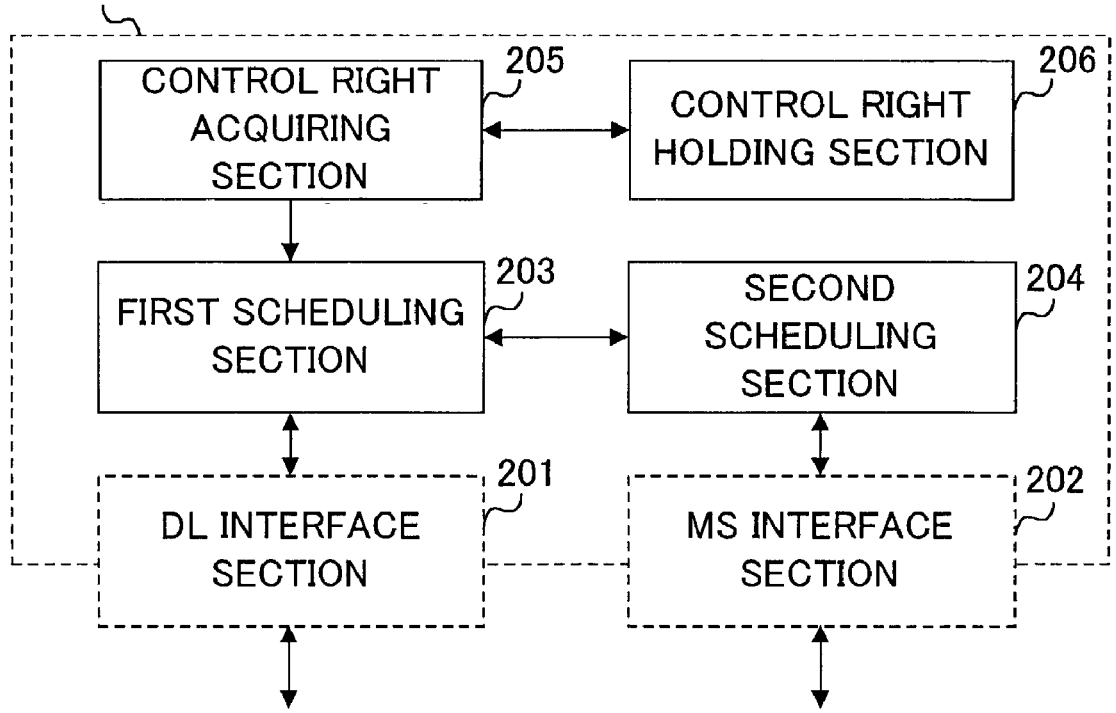
FIG. 5 is a block diagram showing a configuration of a communication terminal holding apparatus according to the first embodiment of the present invention.

The communication terminal holding apparatus 101 is mainly constituted of, as shown in the block diagram in FIG. 5, a DL (direct link type) interface section 201, an MS (muster-slave type) interface section 202, a first scheduling section 203, a second scheduling section 204, a control right acquiring section 205 and a control right holding section 206.

The DL interface section 201 carries out data communication with the WT device apparatus 102, 103 and 104 in the direct link type network. The MS interface section 202 carries out data communication with the MT device apparatus 105 and 106.

The control right acquiring section 205 and the control right holding section 206 are for providing the CC facility; when the control right is not held by the control right holding section 206, the communication terminal holding apparatus 101 acquires the control right in the direct link type network via the control right acquiring section 205.

The first scheduling section 203 is for providing the WT facility; after obtaining the control right, the communication terminal holding apparatus 101 carries out a first scheduling in which communication resources are assigned to the WT device apparatus 102, 103 and 104 in the direct link type network and to the own terminal apparatus (WT) 101 via the first scheduling section 203.

The second scheduling section 204 is for providing the AP facility; the communication terminal holding apparatus 101 carries out a second scheduling in which communication resources are assigned to the MT device apparatus 105 and 106 in the master-slave type network and to the own apparatus (AP) 101.

Further, the communication terminal holding apparatus 101 mediates so as not to allow any competition or collision of the communication resources in the communication between the direct link type network and the master-slave type network by means of cooperation of the first scheduling section 203 and the second scheduling section 204.

Figure 6:
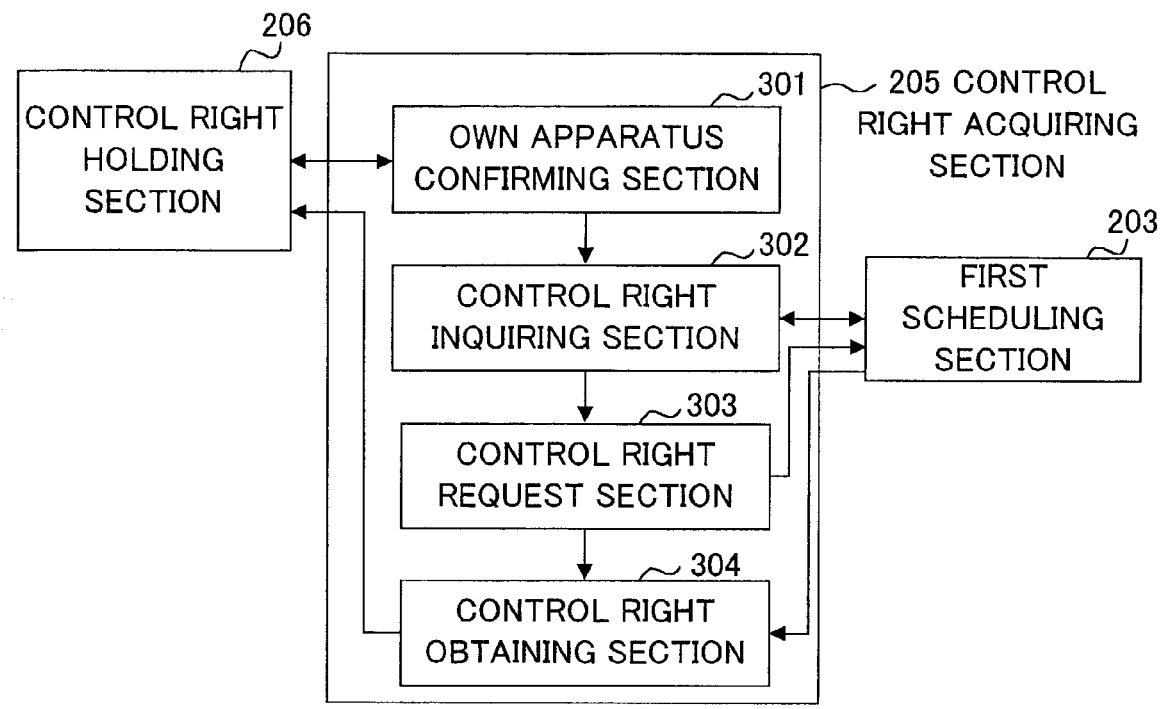
FIG. 6 is a block diagram showing a first internal configuration of a control right acquiring section of the communication terminal holding apparatus according to the first embodiment of the present invention.

FIG. 6 is a block diagram showing a first internal configuration of the control right acquiring section 205 of the communication terminal holding apparatus 101 according to the first embodiment of the present invention. As shown in FIG. 6, the control right acquiring section 205 is constituted mainly of an own apparatus confirming section 301, a control right inquiring section 302, a control right request section 303 and a control right obtaining section 304.

The own apparatus confirming section 301 confirms whether the control right is presently held by the control right holding section 206 or not, i.e., whether the own apparatus has the control right or not. The control right inquiring section 302 inquires to the network which CC/WT device apparatus has the control right of the direct link type network presently. The control right request section 303 requests the control right to a CC/WT device apparatus which has the control right. The control right obtaining section 304 acquires the control right from the CC/WT device apparatus to which the request for the control right is made.

Figure 7:
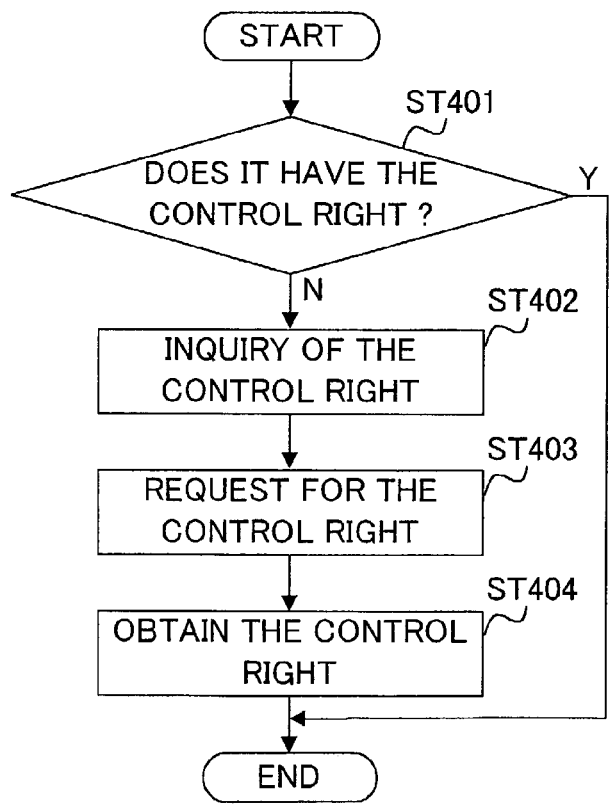
FIG. 7 is a flow sheet illustrating a first control right acquiring operation of a control right acquiring section of the communication terminal holding apparatus according to the first embodiment of the present invention.

The control right acquiring operation in the control right acquiring section 205 is performed in accordance with the flow sheet shown in FIG. 7. First of all, at step (hereinafter, abbreviated to "ST") 401, the own apparatus confirming section 301 operates to confirm whether the own apparatus has the control right or not. At this time, when the own apparatus has the control right, the processing is terminated.

On the other hand, when the own apparatus does not have the control right, at ST402, the control right inquiring section 302 operates to make a notice of inquiry which CC/WT device apparatus has the control right presently onto the network via the first scheduling section 203. The inquiry for the control right is made to the upper layer. The respective CC/WT device apparatus, which has received the notice of inquiry for the control right from the upper layer, makes a notice of a response to the inquiry onto the network. And, the control right acquiring section 205 obtains information (inquiry result), i.e., which apparatus has the control right presently. The inquiry step descried above is for just an example; for example, a step, in which a predetermined request data is transmitted without being interposed by any other layer, may be adopted.

Then, at ST403, the control right request section 303 operates to make a request to an apparatus, which has the control right presently, based on the inquiry result to transfer the control right. This request is made to the upper layer. The CC/WT device apparatus, which has the control right, receives the notice requesting the control right from the upper layer. The step described above is for an example only; for example, a step, in which a predetermined request data is transmitted without being interposed by any other layer or the like, may be used.

Then, at ST404, the control right obtaining section 304 operates to obtain the control right from the CC/WT device apparatus which has the control right, and holds the control right in the control right holding section 206, and the processing is terminated.

Figure 8:
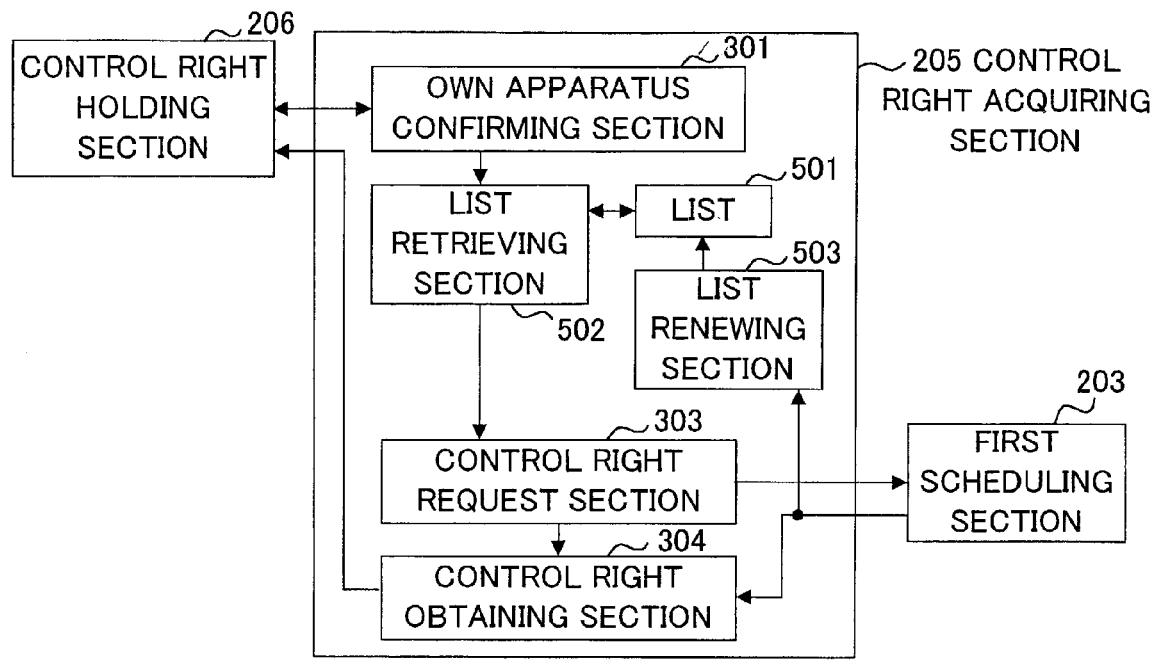
FIG. 8 is a block diagram showing a second internal configuration of a control right acquiring section of the communication terminal holding apparatus according to the first embodiment of the present invention.

FIG. 8 is a block diagram showing a second internal configuration of the control right acquiring section 205 of the communication terminal holding apparatus 101 according to the first embodiment of the present invention. In FIG. 8, the components, which are common to those in FIG. 6, are given with the same reference numerals as in the FIG. 6, and the description thereof will be omitted.

The control right acquiring section 205 shown in FIG. 8 is, compared to FIG. 6, structured so that the control right inquiring section 302 is eliminated there from, and a list 501 of the apparatus belonging to the network, a list retrieving section 502 that retrieves on the list which CC/WT device apparatus has the control right of the direct link type network presently and a list renewing section 503 that renews the list 401 are added thereto.

In the list 501, the apparatus (CC/WT device apparatus only is also available) belonging to the network are registered while being coupled with information that indicates whether the apparatus has the control right presently or not. The control right acquiring section 205 shown in FIG. 8, controls the information concerning the apparatus which has the control right presently via the list 501.

Figure 9:
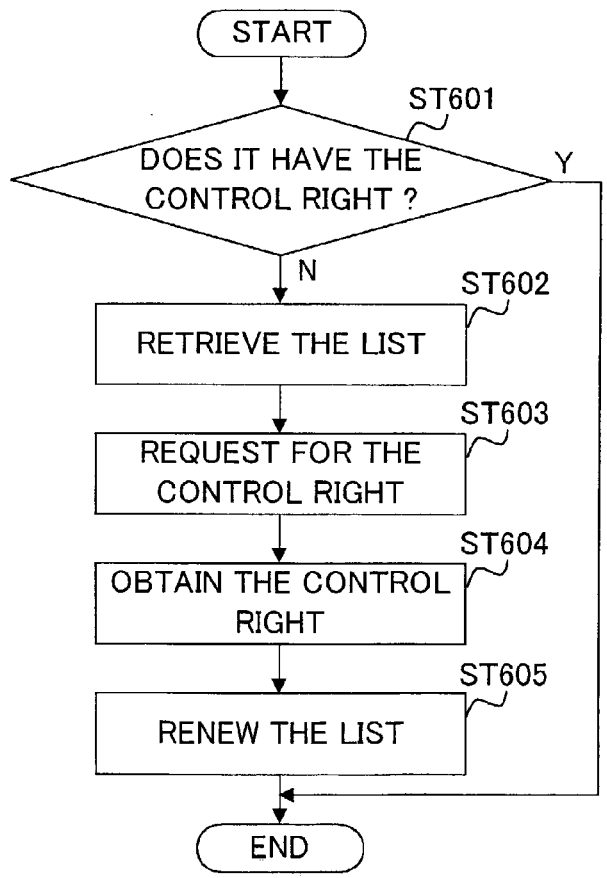
FIG. 9 is a flow sheet illustrating a second control right acquiring operation of the control right acquiring section of the communication terminal holding apparatus according to the first embodiment of the present invention.

The control right acquiring operation in the control right acquiring section 205 is performed in accordance with the flow sheet shown in FIG. 9. First of all, at ST601, the own apparatus confirming section 301 operates to confirm whether the own apparatus has the control right or not. At this time, when the own apparatus has the control right, the processing is terminated.

On the other hand, when the own apparatus does not have the control right, at ST602, the list retrieving section 502 operates to retrieve which apparatus has the control right presently from the list 501.

Then, at ST603, the control right request section 303 operates to make a request, based on the retrieval result of the list retrieving section 502, to the apparatus which has the control right presently to transfer the control right.

Then, at ST604, the control right obtaining section 304 operates to obtain the control right from the CC/WT device apparatus which has the control right presently, and holds the control right in the control right holding section 206.

Further, on a parallel with ST604, at ST605, the list renewing section 503 operates to renew the list of the apparatus having the control right with the latest information. In addition to the timing when the control right is transferred, the list 401 is renewed as necessity arises or periodically.

Figure 10:
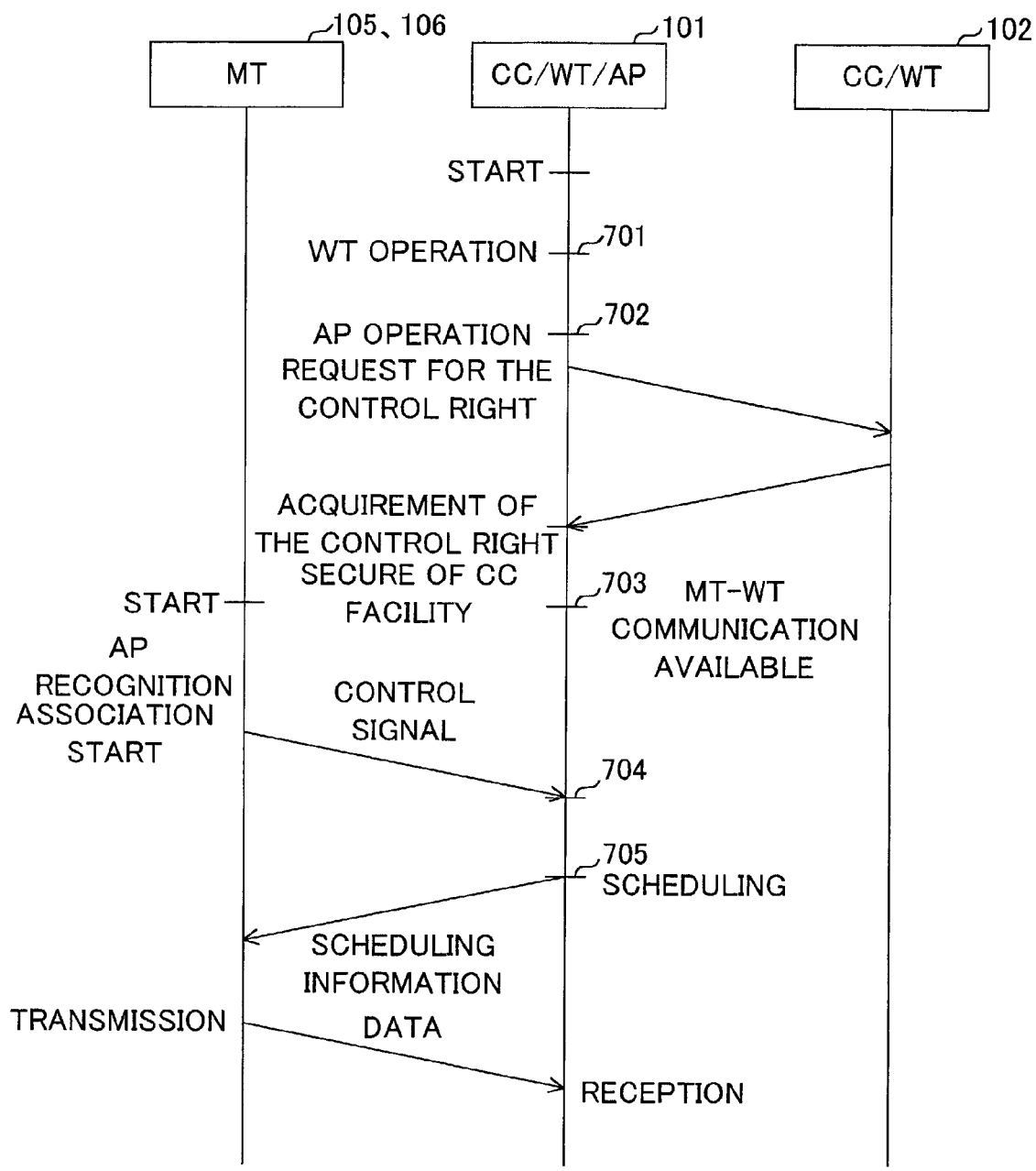
FIG. 10 is a sequence sheet illustrating an operation of the communication terminal holding apparatus according to the first embodiment of the present invention.

Then, referring to the sequence sheet shown in FIG. 10, an operation of the communication terminal holding method in the communication terminal holding apparatus 101 will be described. In FIG. 10, as an initial status, a direct link type network is constituted of a communication terminal holding apparatus 101 and terminal apparatus 102, 103 and 104, and it is assumed that, in the terminal apparatus 102, a CC facility operates in the initial status.

The communication terminal holding apparatus 101, which is provided with the respective CC/WT/AP facilities, operates the WT facility at a timing indicated by a reference numeral 701 immediately after the start (ON).

Next, the AP facility operates to retrieve the existence of MT 105 and 106 at a timing indicated with a reference numeral 702. At the same time, the control right acquiring section 205 is made to operate to acquire the control right of the direct link type network side, and the CC facility is also secured. The control right is acquired in a procedure as described above. To be concrete, the communication terminal holding apparatus 101 makes a request for the control right to the terminal apparatus 102 having the control right, and acquires the control right from the terminal apparatus 102.

Owing to this, at a timing indicated by a reference numeral 703, a status, in which the first and the second scheduling sections 203 and 204 are made to operate and a data communication between the MT device apparatus and the WT device apparatus can be carried out in the both sides of the direct link type network and the master-slave type network, is achieved. As a result, since the communication terminal holding apparatus 101 is enabled to carry out resource control on the MT device apparatus and the resource control on the WT device apparatus, it is enabled to carry out resource assignment evenly to the terminal apparatus held in the own apparatus.

In this state, when the MT device apparatus started up (ON), the MT device apparatus recognizes the existence of an AP and initiates an association (connection in application layer). In this case, since the MT transmits a control signal, the communication terminal holding apparatus 101 detects the existence of the MT device apparatus at a timing indicated by a reference numeral 704, and carries out a scheduling of the data communication with the MT device apparatus at a timing indicated by a reference numeral 705. And, the communication terminal holding apparatus 101 transmits the information subjected to a scheduling (scheduling information), to the MT device apparatus. The MT device apparatus carries out data transmission to the communication terminal holding apparatus 101 in accordance with the received scheduling information. After that, in the same manner as described above, the MT device apparatus can be received within a range of the AP facility of the communication terminal holding apparatus 101.

Although as for the interface sections 201 and 202 shown in FIG. 5, each one of direct type network and master-slave type network is provided, in addition to the above, various modes of network are conceivable; the number thereof may be three or more in accordance with the size and capacity of the communication terminal holding apparatus 101, any constitution, in which the control right acquiring sections 205 corresponding thereto are provided, is acceptable.

As described above, according to the first embodiment, the MT device apparatus can be used as it is in a network in which a direct link type network and a master-slave type network are integrated with each other, since the communication terminal holding apparatus 101 provided with the respective CC/WT/AP facilities is enabled to carry out, after acquiring the control right of the direct link type network, a communication resource assignment of each network so as not to allow any competition or collision to occur.

However, when the communication terminal holding apparatus 102, which is provided with the facilities of CC/WT, has the control right and assigns communication resources, the direct link type network and the master-slave type network can not be used evenly. The reason of this is that, since the communication terminal holding apparatus 101 is also one of the WT device apparatus when viewed from the communication terminal holding apparatus 104, and when sufficient communication resource is requested at AP side from the communication terminal holding apparatus 101, it is seemed as if communication resources which are available for several terminals at once were requested from one WT device apparatus. And the communication terminal holding apparatus 104, due to the relationship with the request from the other WT device apparatus, can not always assign communication resources enough to satisfy the request to the communication terminal holding apparatus 101.

Contrarily to this, when the communication terminal holding apparatus 101 has the control right and assign the communication resource, since both of the WT device apparatus and the MT device apparatus can be taken into consideration, it is enabled to use the direct link type network and the master-slave type network evenly.

(Second Embodiment)

Figure 11:
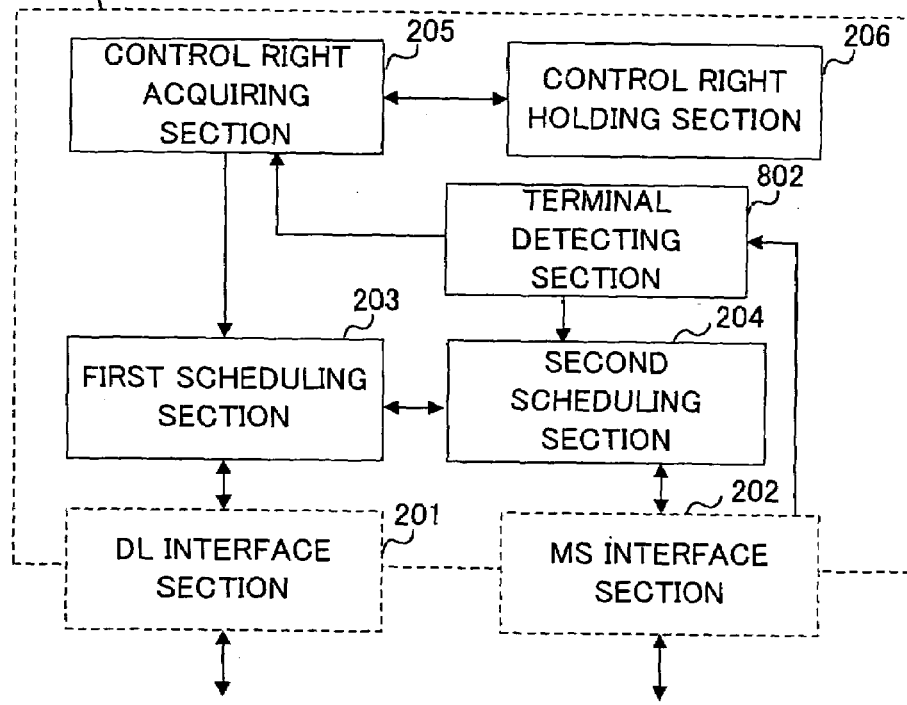
FIG. 11 is a block diagram showing a configuration of a communication terminal holding apparatus according to a second embodiment of the present invention.

FIG. 11 is a block diagram showing a configuration of a communication terminal holding apparatus according to a second embodiment of the present invention. In a communication terminal holding apparatus 801 shown in FIG. 11, the components, which are the same as those in the communication terminal holding apparatus 101 shown in FIG. 5, are given with the same reference numerals as those in FIG. 5, and the description thereof will be omitted.

The communication terminal holding apparatus 801 shown in FIG. 11 is different from the communication terminal holding apparatus 101 shown in FIG. 5 in a point that a terminal detecting section 802, which detects the MT device apparatus in the master-slave type network, is added.

The terminal detecting section 802 detects an MT device apparatus in the master-slave type network via the MT interface section 202 and notices the result to the control right acquiring section 205 and the second scheduling section 204.

Owing to this, although the control right is periodically transferred between the communication terminal holding apparatus in an ordinary direct link type network, in the second embodiment, when a communication request is made from an MT device apparatus the control right acquiring section 205 can promptly get into an operation to acquire the control right in the case where the control right holding section 206 does not have the control right, and the second scheduling section 204 can promptly perform second scheduling. Accordingly, it is enabled to shorten the time up to the start of data communication between the MT device apparatus and the WT device apparatus.

Although the terminal detecting section 802 is provided as a one for either one of the networks, the terminal detecting section 802 may be provided as a one for the respective networks depending on the various modes of the networks.

(Third Embodiment)

Figure 12:
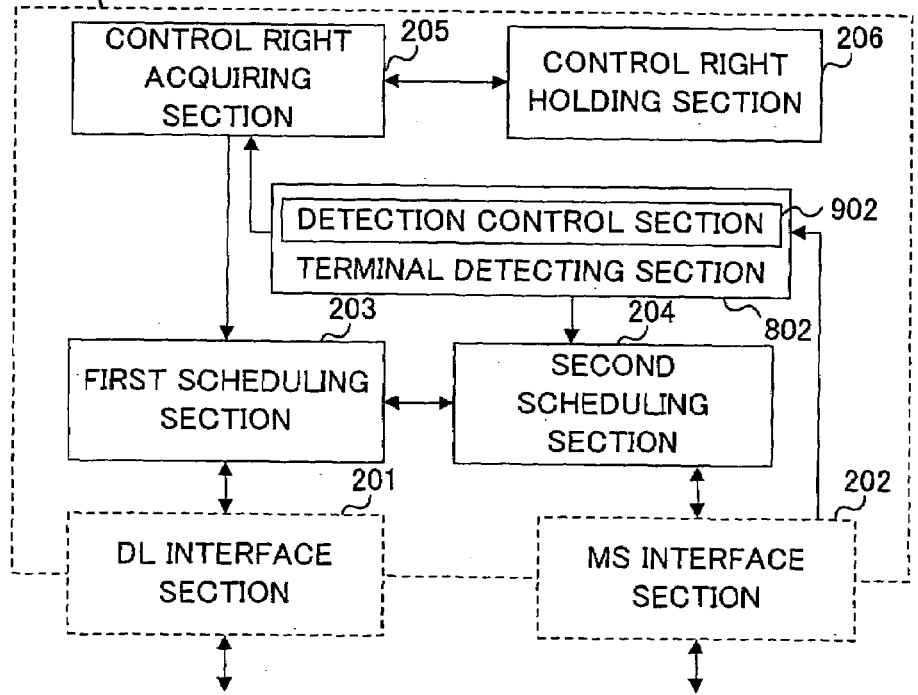
FIG. 12 is a block diagram showing a configuration of a communication terminal holding apparatus according to a third embodiment of the present invention.

FIG. 12 is a block diagram showing a configuration of a communication terminal holding apparatus according to a third embodiment of the present invention. In the communication terminal holding apparatus 901 shown in FIG. 12, the components, which are the same as those of the communication terminal holding apparatus 801 shown in FIG. 11, are given with the same reference numerals as the FIG. 11 and the description thereof will be omitted.

The communication terminal holding apparatus 901 shown in FIG. 12 is different from the communication terminal holding apparatus 801 shown in FIG. 11 in a point that a detecting control section 902 is provided within the terminal detecting section 802.

The detecting control section 902 controls so as to secure the CC facility by the control right acquiring section 205 and the first scheduling section 203 and to perform the AP facility by the second scheduling section 204 intermittently or periodically for a period of time until the existence of an MT device apparatus is detected by the terminal detecting section 802.

Figure 13:
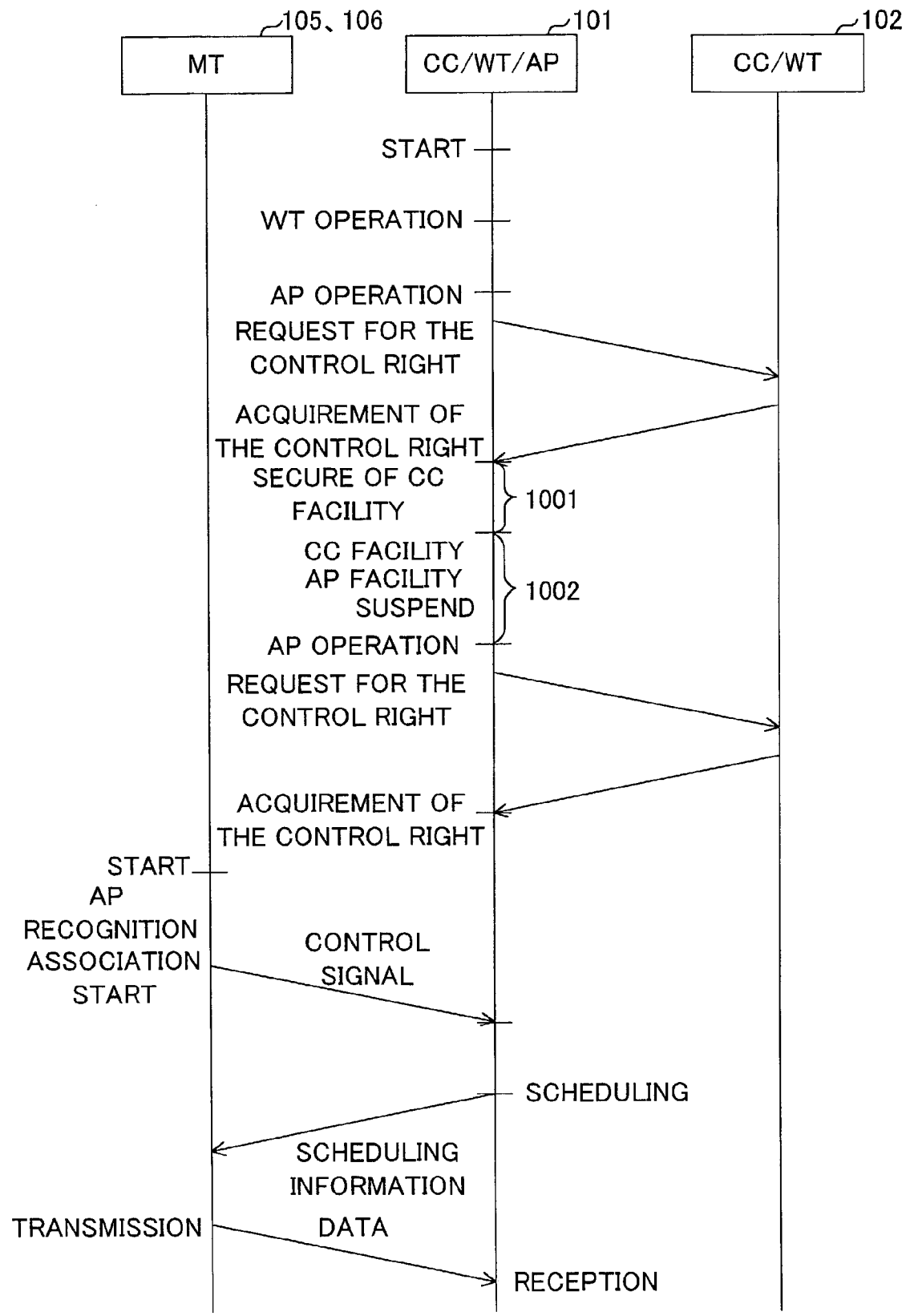
FIG. 13 is a sequence sheet illustrating an intermittent operation of CC and AP facilities before detecting an MT device apparatus by the communication terminal holding apparatus according to the third embodiment of the present invention.

For example, as shown in FIG. 13, for a period of time until the existence of an MT is detected, the CC facility is secured and the operation of the AP facility is performed in a period indicated by a reference numeral 1001, and securing of the CC facility and the AP facility is suspended in the period indicated by a reference numeral 1002. That is to say, the securing of the CC facility and the operation of the AP facility are made to perform intermittently or periodically.

As described above, according to the communication terminal holding apparatus 901 of the third embodiment, when another terminal apparatus having the CC/WT facilities or communication terminal holding apparatus having CC/WT/AP facilities makes a request for the control right onto the direct link type network, the communication terminal holding apparatus 901 can allow the another terminal apparatus to carry out a communication, since the communication terminal holding apparatus 901 can suspend the CC facility to release the control right.

Also, for a period of time when the existence of an MT device apparatus is not detected, a waste of communication resources and power consumption can be reduced by suspending the AP facility.

In FIG. 13, although the CC facility is suspended for a period indicated by the reference numeral 1002, unless particularly any request is made from other terminal apparatus, it is not always necessary to suspend the CC facility or to release the control right.

Also, although the detecting control section 902 is provided as a one for either one of the networks, the detecting control section 902 may be provided as a one for the respective networks depending on the various modes of the networks. Herein, in the various modes of the networks, a network of a radio LAN system or the like specified by IEEE802.11 is included.

Figure 14:
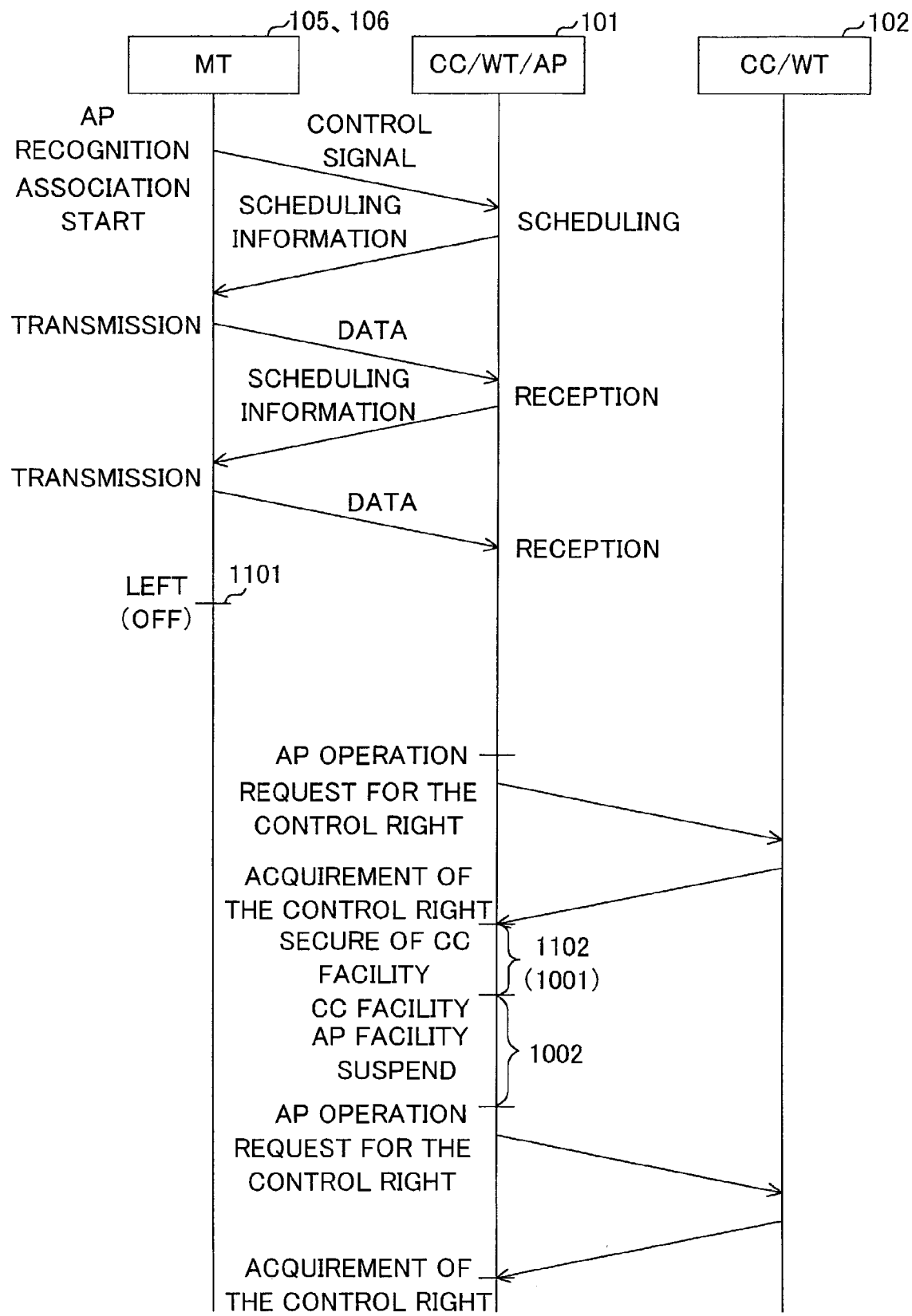
FIG. 14 is a sequence sheet illustrating an intermittent operation of CC and AP facilities when the MT device apparatus is made to leave from the network by the communication terminal holding apparatus according to the third embodiment of the present invention.

Further, it is assumed that an MT device apparatus, which has completed a data communication, has left from a master-slave type network in operation as indicated by a reference numeral 1101 in FIG. 14. In this case, assuming that the MT device apparatus is the only one terminal apparatus within the master-slave type network, the communication terminal holding apparatus 901 having the CC/WT/AP facilities can obtain the same effect as the forgoing initial status, by returning once, as indicated by a reference numeral 1102, to the initial status of the MT device apparatus detection in a period of time indicated by reference numerals 1001 and 1002 in FIG. 13.

Figure 15:
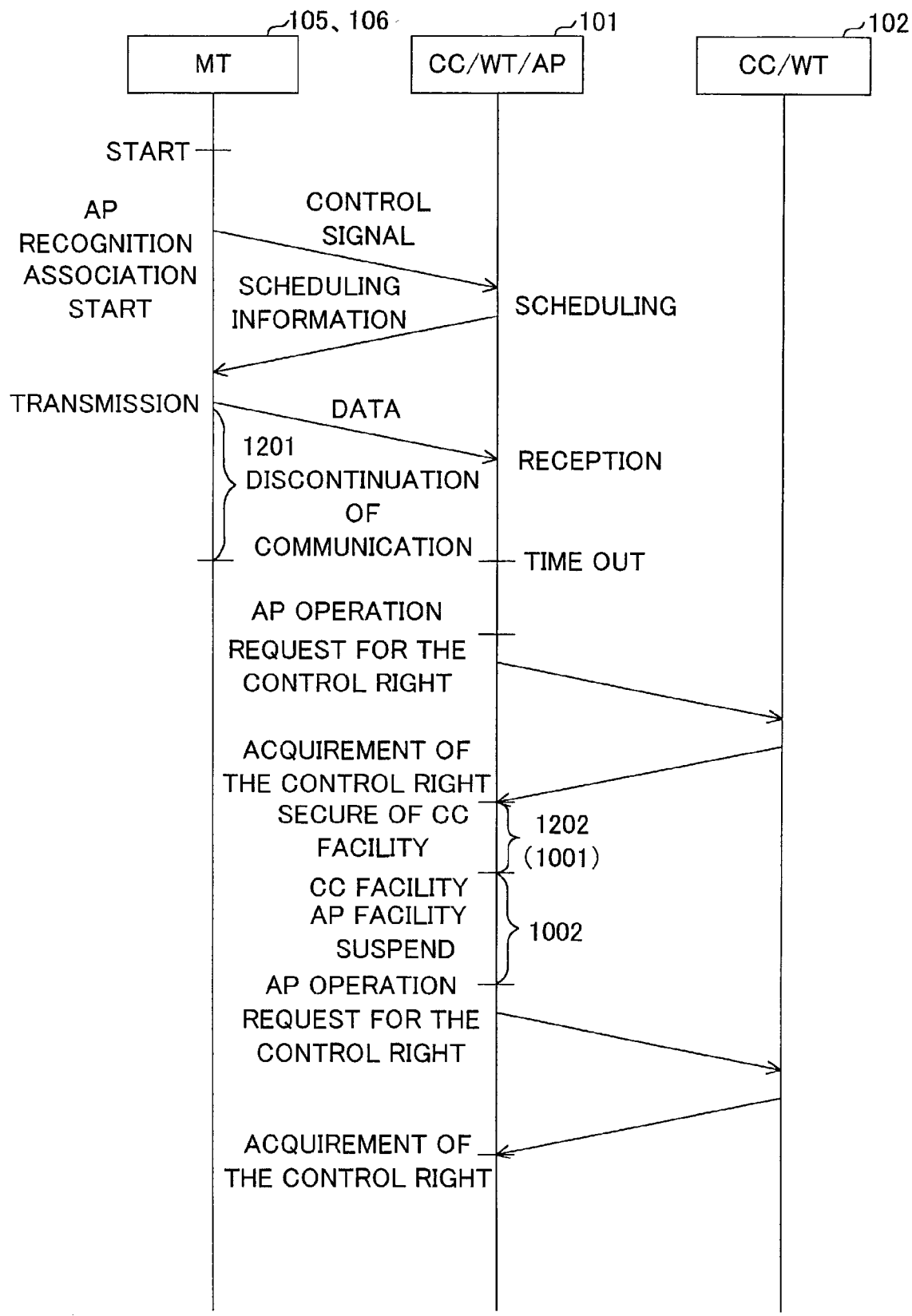
FIG. 15 is a sequence sheet illustrating an intermittent operation of CC and AP facilities at no-response of the MT device apparatus made by the communication terminal holding apparatus according to the third embodiment of the present invention.

Furthermore, as indicated by a reference numeral 1201 in FIG. 15, in a case where an MT does not carry out data transmission or reception for along period of time, or the MT gets into a state that a communication is interrupted by some obstacle, the communication terminal holding apparatus 901 having the CC/WT/AP facilities can obtain the same effect as the forgoing initial status by setting a specific time-out beforehand, and by returning once, as indicated by a reference numeral 1202, to the initial status of the MT device apparatus detection in a period of time indicated by reference numerals 1001 and 1002 in FIG. 13 when the specific time-out has been exceeded.

Still further, as for the forgoing time-out setting, a specific fixed period of time is available, or taking into consideration the urgency or priority of the communication, the time-out period may be determined dynamically.

Still furthermore, the detecting control section 902 may be adapted so as to control to make the detecting control section 902 and the second scheduling section 204 operate intermittently or periodically at a gradually multiplied cycle of communication frame timing.

Owing to the configuration described above, the control right acquiring and the second scheduling can be made to perform intermittently while synchronizing with the communication operation of the network.

Furthermore, the forgoing period of the time-out may be set in accordance with the urgency of the communication of the MT device apparatus. Owing to the configuration, a wasteful communication control operation for an MT device apparatus, of which communication urgency is low, can be reduced.

Still furthermore, the period of the time-out may be set in accordance with the communication classification of the MT device apparatus. Owing to the configuration, a wasteful communication control operation for an MT device apparatus, which is classified in a specific communication class, can be reduced.

As demonstrated above, according to the present invention, it is enabled to use an MT device apparatus as it is in a network in which a direct link type network and a master-slave type network are integrated with each other.

This application is based on the Japanese Patent Application No.2000-257902 filed on Aug. 28, 2000 and the Japanese Patent Application No.2001-067171 filed on Mar. 9, 2001; entire contents of which are expressly incorporated by reference herein.

INDUSTRIAL APPLICABILITY

The present invention is applicable to a wire communication system and a mobile communication system in a network in which a direct link type network and a master-slave type network are integrated with each other.

The invention claimed is:

1. A communication terminal holding apparatus used for a network in which a direct link type network and a master-slave type network are integrated with each other, said communication terminal holding apparatus comprising:
a control right acquiring section that specifies an apparatus having control right when the communication terminal holding apparatus does not have the control right, requests a transfer of the control right from the apparatus having the control right and acquires the control right of said direct link type network;
a first scheduling section that assigns communication resources to a terminal apparatus in said direct link type network after acquiring the control right; and
a second scheduling section that assigns communication resources to a slave terminal apparatus in said master-slave type network while cooperating with said first scheduling section so as not to cause any competition or collision of communication resources.

2. The communication terminal holding apparatus according to claim 1, comprising a detecting section that detects whether any communication request is made or not from the slave terminal apparatus, wherein:
the control right acquiring section promptly enters into an operation to acquire the control right in a case where the control right acquiring section does not have the control right when a communication request from the slave terminal apparatus is detected by said detecting section; and
the second scheduling section promptly enters into an operation to assign communication resources when a communication request from the slave terminal apparatus is detected by said detecting section.

3. The communication terminal holding apparatus according to claim 2, comprising a control section that controls to make the control right acquiring section and the second scheduling section intermittently operate when the communication request from slave terminal apparatus is not detected by said detecting section.

4. The communication terminal holding apparatus according to claim 3, wherein the control section controls to make the control right acquiring section and the second scheduling section intermittently operate when every slave terminal apparatus in the relevant master-slave type network has left the network or at a state of timeout where there is no response for a predetermined period of time after detecting the slave terminal apparatus by the detecting section.

5. The communication terminal holding apparatus according to claim 3, wherein the control section controls to make the control right acquiring section and the second scheduling section intermittently operate when every slave terminal apparatus in the related master-slave type network gets into a standby status after detecting the slave terminal apparatus by the detecting section.

6. The communication terminal holding apparatus according to claim 3, wherein the control section controls to make the control right acquiring section and the second scheduling section intermittently operate at a gradually multiplied cycle of communication frame timing.

7. The communication terminal holding apparatus according to claim 1, wherein, when the communication terminal holding apparatus does not have the control right, the control right acquiring section inquires for an apparatus that has the control right to the network to which the communication terminal holding apparatus is belonged and specifies the apparatus having the control right.

8. The communication terminal holding apparatus according to claim 1, wherein the control right acquiring section comprises a list of apparatus having the control right in the network to which the communication terminal holding apparatus is belonged, and, when the communication terminal holding apparatus does not have the control right, retrieves the list and specifies the apparatus having the control right.

9. The communication terminal holding apparatus according to claim 4, wherein the period of time-out is set in accordance with communication urgency of a slave terminal apparatus.

10. The communication terminal holding apparatus according to claim 4, wherein the period of time-out is set in accordance with classification of communication class of a slave terminal apparatus.

11. A base station apparatus comprising a communication terminal holding apparatus used for a network in which a direct link type network and a master-slave type network are integrated with each other, said communication terminal holding apparatus comprising:
- a control right acquiring section that specifies an apparatus having control right when the communication terminal holding apparatus does not have the control right, requests a transfer of the control right from the apparatus having the control right and acquires the control right of said direct link type network;
- a first scheduling section that assigns communication resources to a terminal apparatus of said direct link type network after acquiring the control right; and
- a second scheduling section that assigns communication resources to a slave terminal apparatus of said master-slave type network while cooperating with said first scheduling section so as not to cause any competition or collision of communication resources.

12. The communication terminal holding apparatus according to claim 1, comprising an access point facility in the master-slave type network and a central controller facility and a wireless terminal facility in the direct link type network.

13. A communication terminal holding method of communication terminal holding apparatus used in a network in which a direct link type network and a master-slave type network are integrated with each other, comprising:
- specifying an apparatus having control right when the communication terminal holding apparatus does not have the control right, requesting a transfer of the control right from the apparatus having the control right and acquiring the control right of communication in the direct link type network;
- carrying out a first scheduling in which communication resources are assigned to a terminal apparatus in the direct link type network after acquiring the control right; and
- carrying out a second scheduling in which communication resources are assigned to a terminal apparatus in the master-slave type network while mediating a communication between the direct link type network and the master-slave type network by cooperating with said first scheduling so as not to cause any competition or collision of communication resources.

* * * * *